United States Patent [19]

Tomita

[11] Patent Number: 4,656,857
[45] Date of Patent: Apr. 14, 1987

[54] METHOD FOR CUTTING UNCOILED WEB

[75] Inventor: Yoshikazu Tomita, Komatsu, Japan

[73] Assignee: Kabushiki Kaisha Komatsu Seisakusho, Tokyo, Japan

[21] Appl. No.: 800,328

[22] Filed: Nov. 21, 1985

[30] Foreign Application Priority Data

Nov. 29, 1984 [JP] Japan ................ 59-250411

[51] Int. Cl.$^4$ .......................................... B21F 11/00
[52] U.S. Cl. ........................................ 72/131; 72/161;
 83/42; 83/208; 83/236; 83/250; 83/364;
 83/365; 83/367
[58] Field of Search ................ 83/42, 208, 236, 250,
 83/364, 367, 365, 370; 72/131, 161, 178

[56] References Cited

U.S. PATENT DOCUMENTS

| | | | |
|---|---|---|---|
| 3,796,117 | 3/1974 | Mukai et al. | 83/236 X |
| 3,978,703 | 9/1976 | Primich et al. | 83/236 X |
| 4,375,759 | 3/1983 | Gentile | 83/236 X |
| 4,545,780 | 10/1985 | Martin | 83/236 X |

FOREIGN PATENT DOCUMENTS

| | | |
|---|---|---|
| 52-12949 | 4/1977 | Japan . |
| 56-66336 | 6/1981 | Japan . |
| 56-136237 | 10/1981 | Japan . |
| 57-26850 | 6/1982 | Japan . |
| 59-16716 | 2/1984 | Japan . |
| 59-66922 | 4/1984 | Japan . |

Primary Examiner—Frank T. Yost
Attorney, Agent, or Firm—Vorys, Sater, Seymour & Pease

[57] ABSTRACT

In an uncoiled web feed line including a shear, continuous feed and measuring pinch rolls, a pit for accommodating a loop portion of an uncoiled web, intermittent feed pinch rolls and a metal mold arranged in succession, there is provided a novel method for cutting an uncoiled web at its midway position by a shear such that when the production by the metal mold is continued for the uncoiled web forward of the cut position, just one lot of a desired number of products can be produced without being associated with an excessive waste web.

4 Claims, 2 Drawing Figures

METHOD FOR CUTTING UNCOILED WEB

BACKGROUND OF THE INVENTION

The present invention relates to a method for cutting an uncoiled web in an uncoiled web feed line.

Heretofore, in an uncoiled web feed line, if a predetermined number of products have been finished midway of one coil of web, then either one of the following measures were taken:

(1) The uncoiled web was cut at an inlet of a metal mold, and the uncoiled web backward of the cut position was rewound onto the original coil.

(2) The uncoiled web was cut by a shear, then the uncoiled web on the side of a press with respect to the shear was continued to be fed for production, and only the uncoiled web on the opposite side with respect to the shear was rewound.

In the case of the first measure above, the time for processing was prolonged by the time necessitated for rewinding, while in the case of the second measure above, there was a shortcoming in that the number of finished products was inaccurate. Also, a waste web material was apt to become large, and so, the yield was poor. The present invention has been worked out in view of the above-mentioned background in the art.

SUMMARY OF THE INVENTION

It is therefore one object of the present invention to provide a novel method for cutting an uncoiled web in an uncoiled web feed line, in which a waste web is only a margin web length reserved for compensating for an error in a loop length of the uncoiled web, so that the number of finished products can be assured, and control for the number of products can be achieved accurately with only a short rewinding time.

According to one feature of the present invention, there is provided a method for cutting an uncoiled web in an uncoiled web feed line including a shear, a cleaner, a leveler, continuous feed and measuring pinch rolls, a pit for accommodating a loop portion of the uncoiled web, intermittent feed pinch rolls and a metal mold arranged in succession, in which when a number of products formed by the metal mold has reached an integral part of $N_2$, continuous production is temporarily stopped. The uncoiled web is further fed by driving the leveler until the loop portion of the uncoiled web reaches a predetermined lower limit position. Then the uncoiled web is additionally fed by a length $L_3$, and the uncoiled web is cut at its midway position by the shear. Assuming that N represents a number of products in one lot, F represents a feed pitch, $L_1$ represents a web length (with its loop portion held at the lower limit position) between the shear and the intermittent feed pinch rolls, $L_2$ represents a web length between the intermittent feed pinch rolls and an inlet of the metal mold, then $N_1$, $N_2$ and $L_3$ are derived by the following equations:

$$N_1 = \frac{L_1 + L_2}{F},$$

$$N_2 = N - N_1, \text{ and}$$

$$L_3 = F \times (\text{a decimal part of } N_2).$$

According to another feature of the present invention, there is provided a method for cutting an uncoiled web in an uncoiled web feed line including a shear, a cleaner, a leveler, continuous feed and measuring pinch rolls, a pit for accommodating a loop portion of the uncoiled web, intermittent feed pinch rolls and a metal mold arranged in succession, in which a total length of the uncoiled web starting from its leading edge is measured by counting a number of pulses generated by a pulse generator coupled to a shaft of the continuous feed and measuring pinch rolls. When the measured total length of the uncoiled web has reached L, the uncoiled web is cut at its midway position by the shear. Assuming that N represents a number of products in one lot, F represents a feed pitch, $L_2'$ represents a predetermined length of waste portion of the uncoiled web reserved at its leading edge, $L_3'$ represents a web length between the shear and the continuous feed and measuring pinch rolls, and L and $L_1$ are derived by the following equations:

$$L_1' = F \times N, \text{ and}$$

$$L = L_1' + L_2' - L_3'.$$

The above-mentioned and other features and objects of the present invention will become more apparent by reference to the following description of preferred embodiments of the invention taken in conjunction with the accompanying drawings.

DESCRIPTION OF THE PREFERRED EMBODIMENTS

Figure 1:
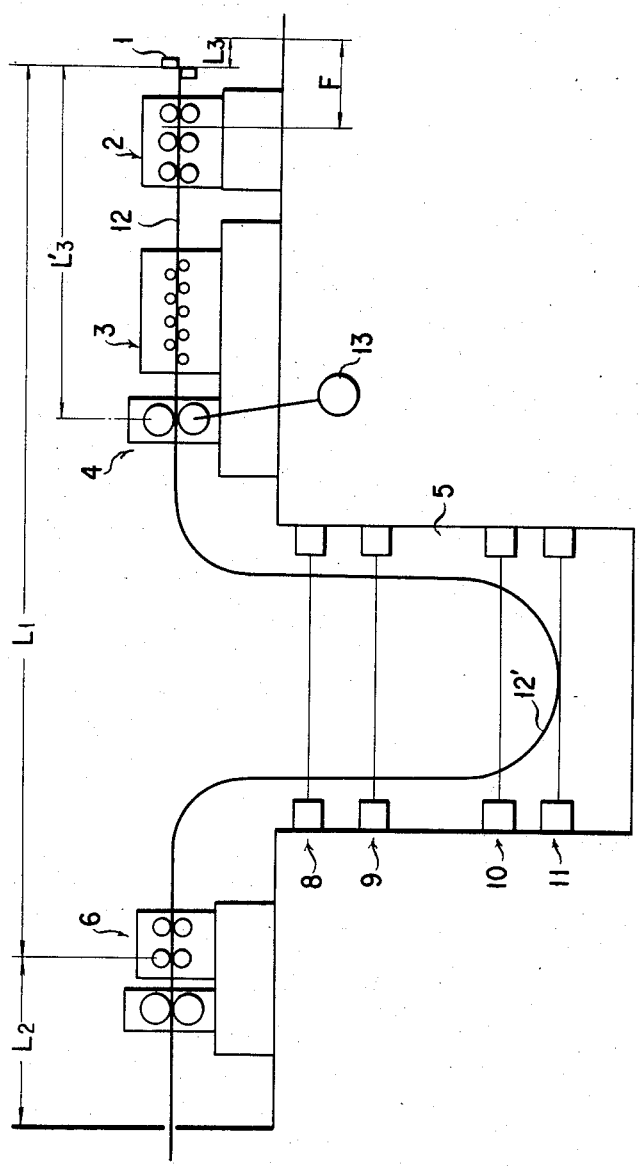
FIG. 1 is a schematic system diagram of an uncoiled web feed line, to which the method for cutting an uncoiled web according to the present invention is applicable

Referring now to FIG. 1, one example of an uncoiled web feed line to which the method according to the invention for cutting an uncoiled web is applicable, is shown. A web 12 uncoiled from a coil (not shown) is passed through a shear 1 from the right to the left as viewed in FIG. 1. Then, the web 12 is successively passed through a cleaner 2 for cleaning its opposite surfaces, a leveler 3 for flattening the uncoiled web 12, continuous feed and measuring pinch rolls 4 for continuously advancing the uncoiled web 12 and measuring a passed length thereof as coupled to a pulse generator 13, and a pit 5 for accommodating a loop portion, that is, a sagging portion 12' of the uncoiled web 12 which is necessitated for allowing intermittent feed of the uncoiled web 12 by means of intermittent feed pinch rolls 6. After the web 12 has passed through another pair of pinch rolls, it is fed to an inlet of a metal mold (not shown). The vertical line at the left end in FIG. 1 represents the inlet of the metal mold. The continuous feed speed of the uncoiled web 12 is determined by the drive speed of the rolls in the leveler 3 and/or the continuous feed and measuring pinch rolls 4. The intermittent feed speed at the inlet of the metal mold is controlled by the drive speed of the intermittent feed pinch rolls 6. In order to control the length of the loop portion 12' of the uncoiled web 12, three pairs of photo-electric switches and light sources 8, 9 and 10 are provided in the pit 5. In addition, for the purpose of defining the lower limit position (i.e., a reference position), another pair of a photo-electric switches and a light source 11 is provided beneath the pairs 8, 9 and 10. The photo-electric switch and light source pairs 8, 9, 10 and 11 detect the existence or non-existence of the loop portion 12' at the given levels of the switch pairs. The drive speed of the rolls in the leveler 3 is thus controlled according to the level of the bottom of the loop portion 12' as detected by these photo-electric switch and light source pairs 8, 9, 10 and 11 so that the bottom of the loop portion 12 can be maintained within an appropriate level range during the intermittent feed of the uncoiled web 12 to the metal mold.

The reference numeral 13 designates a pulse generator coupled to a rotary shaft of the continuous feed and measuring pinch rolls 4 for generating pulses at a repetition frequency proportional to the rotational speed of the continuous feed and measuring pinch rolls 4. The reference symbol $L_1$ represents a length of the uncoiled web 12 between the intermittent feed pinch rolls 6 and the shear 1 with the loop portion 12' held at its lower limit position as illustrated in FIG. 1. The reference symbol $L_2$ represents a length of the uncoiled web 12 between the intermittent feed pinch rolls 6 and the inlet of the metal mold.

In a controller, not shown, associated with the uncoiled web feed line shown in FIG. 1, the web length $L_1$ and the web length $L_2$ which have constant values, respectively, are input to a computer and the sum of $L_1$ and $L_2$ is calculated. In addition, a feed pitch F which is a fixed value determined depending upon the size of the metal mold, and a number N of products in one lot which is also a given constant value, are input to the computer in the controller. Thus, in the computer, the following values can be calculated:

$$N_1 = \frac{L_1 + L_2}{F},$$

$N_2 = N - N_1$, and $N_3 = F \times$ (a decimal part of $N_2$).

When a number N' of products formed by the metal mold has reached an integral part of $N_2$, the continuous production is temporarily stopped. Then the leveler 3 is driven in the forward direction to further feed the uncoiled web by a certain length until the bottom of the loop portion 12' reach its lower limit position, that is, the level of the lowermost pair 11 of the photo-electric switch and the light source. Furthermore, the uncoiled web 12 is fed by a length $L_3$ as indicated above. Then the uncoiled web 12 is cut at the midway position by the shear 1.

Thereafter, the cut uncoiled web portion behind the shear 1 is rewound into the original coil, while the cut uncoiled web portion in front of the shear 1 is again subjected to the continuous production process by means of the metal mold. Then the number N'' of products formed after restart of the continuous production is as follows, as will be seen from the above equations:

$$N'' = \frac{L_1 + L_2 + L_3}{F} = N_1 + \text{(a decimal part of } N_2)$$

Since the number N' of products formed before cutting is equal to an integral part of $N_2$, the total number of formed products is as follows:

$N' + N'' =$ an intergral part of $N_2$) + $N_1$ +

(a decimal part of $N_2$)

$= N_1 + N_2$ $= N$

Thus it has been proved that the total number of formed products is exactly equal to the desired number N of products in one lot.

Figure 2:
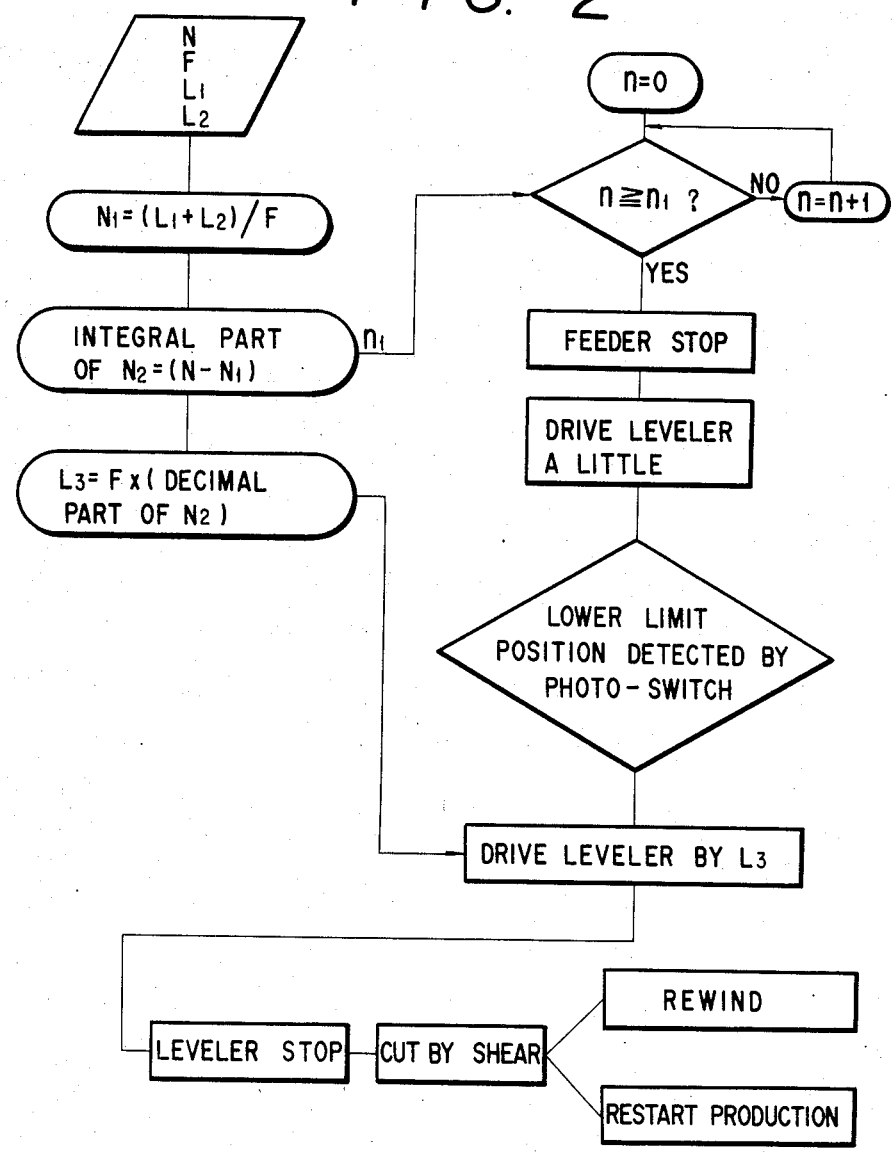
FIG. 2 is a flow chart which diagrammatically shows the method for cutting an uncoiled web according to the first preferred embodiment of the present invention.

The mode of control for operation of the uncoiled web feed line is diagrammatically shown by a flow chart in FIG. 2. It is to be noted that in this flow chart, $n_1$ represents an integral part of $N_2$ and n represents a number of formed products, which is initially set to zero.

According to another preferred embodiment of the present invention, in the same uncoiled web feed line shown in FIG. 2, the uncoiled web 12 can be cut under a different mode of control. In this alternative method for cutting an uncoiled web, a total length of the uncoiled web 12 passed through the continuous feed and measuring pinch rolls 4 starting from the leading edge of the uncoiled web 12 is measured by counting the number of pulses generated from the pulse generator 13 coupled to a rotary shaft of the continuous feed and measuring pinch rolls 4. A length of a waste web portion to be reserved at the leading end of the uncoiled web 12 is predetermined, and is preset as a length $L_2'$ in the computer of the controller. A length of the uncoiled web 12 between the continuous feed and measuring pinch rolls 4 and the shear 1 is also preset as a length $L_3'$. From these input data, lengths $L_1'$ and L are calculated according to the following equations:

$L_1' = F \times N$, and $L = L_1' + L_2' - L_3'$.

When the length of the uncoiled web 12 passed through the continuous feed and measuring pinch rolls 4 has reached the value L, feeding of the uncoiled web 12 by the leveler 3 is just stopped, and the uncoiled web is cut at its midway position by the shear 1. Then the cut uncoiled web portion behind the shear 1 is rewound into the original coil, and the cut uncoiled web portion in front of the shear 1 is again subjected to the continuous production by driving the leveler 3.

Before interruption of the continuous production a length L of the uncoiled web 12 passed through the continuous feed and measuring pinch rolls 4, and after restart of the continuous production, a length $L_3'$ of the uncoiled web 12 is passed through the continuous feed and measuring pinch rolls 4. Therefore, in total, a length of $L + L_3' = (L_1' + L_2' - L_3') - L_3' = L_1' + L_2'$ of the uncoiled web 12 is passed through the continuous feed and measuring pinch rolls 4 and formed into the desired products. Consequently, if the reserved waste portion at the leading end of the uncoiled web 12 is omitted from the production, in total a number of $$\frac{(L_1' + L_2') - L_2'}{F} = \frac{L_1'}{F} = N$$

of products can be produced. This is exactly equal to the desired number of products in one lot.

Moreover, according to the second method, an error caused by indefinite position of the loop portion 12' of the uncoiled web 12 does not arise in the size of the waste portion of the uncoiled web even though the step of stopping the continuous production and adjusting the loop portion 12' to its lower limit position is omitted. If any error should arise, it is only that caused by an error in the measurement of the passed web length. In addition, the time required for production can be shortened by the period necessitated for position adjustment of the loop portion 12, and so, production efficiency can be enhanced.

Thus, according to the present invention, a length of a waste web portion to be reserved is only the margin for absorbing an error in the length of the loop portion, and the desired number of products in one lot can be assured. Furthermore, since the cut uncoiled web portion behind the shear is simply rewound into the original coil and the cut uncoiled web portion in front of the shear is only subjected to further production, control of the number of products can be achieved accurately with only a short rewinding period, and the size of the waste web portion can be minimized.

While a principle of the present invention has been described above in connection to preferred embodiments of the invention, many changes can be made to the above-described embodiments without departing from the spirit of the present invention.

What is claimed is:

1. A method for cutting an uncoiled web in an uncoiled web feed line including a shear, continuous feed and measuring pinch rolls, a pit for accommodating a loop portion of the uncoiled web, intermittent feed pinch rolls, and a mold for forming products arranged in a sequence, comprising the steps of:
   determining when the number of products formed by said metal mold has reached a predetermined integral number $N_2$;
   stopping continuous production of said parts when said predetermined number has been reached;
   further advancing said uncoiled web until the loop portion of said uncoiled web reaches a predetermined lower limit position;
   additionally advancing said uncoiled web by a length $L_3$; and
   cutting said uncoiled web at its midway position by said shear, when $N_1$, $N_2$ and $L_3$ are derived according to the following equations:

$$N_1 = \frac{L_1 + L_2}{F}$$

$$N_2 = N - N_1, \text{ and}$$

$$L_3 = F \times (\text{a decimal part of } N_2),$$

where N represents a number of products in one lot; F represents a feed pitch; $L_1$ represents a web length with its loop portion held at a lower limit position between said shear and said intermittant feed pinch rolls; and $L_2$ represents a web length between said intermittant feed pinch rolls and an inlet of said metal mold.

2. The method as set forth in claim 1, wherein said web feed line further includes a leveler and the step of advancing said uncoiled web is carried out by driving said leveler until the loop portion of said uncoiled web reaches a predetermined lower level position.

3. A method for cutting an uncoiled web in an uncoiled feed line including a shear, continuous feed and measuring pinch rolls, a pit for accommodating a loop portion of said uncoiled web, intermittent feed pinch rolls, and a mold arranged in sequence, comprising the steps of:
   measuring the total length of said uncoiled web starting from its leading edge until the measured total length of said uncoiled web has reached a length L;
   cutting said uncoiled web at its midway position by said shear according to the relationships $$L_1' = F \times N, \text{ and}$$

$$L = L_1' + L_2' - L_3',$$

where N represents a number of products in a lot; F represents a feed pitch, $L_2'$ represents a predetermined length of waste portion of said uncoiled web reserved at its leading edge, and $L_3'$ represents a web length between said shear and said continuous feed and measuring pinch rolls.

4. The method as set forth in claim 3, wherein the step of measuring is determining by counting the number of pulses generated by a pulse generator coupled to a shaft of said continuous feed and measuring pinch rolls.

* * * * *